United States Patent
Larsson et al.

(10) Patent No.: US 7,218,893 B2
(45) Date of Patent: May 15, 2007

(54) METHOD FOR INTERFERENCE SOURCE IDENTIFICATION

(75) Inventors: Kjell Larsson, Lulea (SE); Bjorn Svensson, Lulea (SE); Jorgen Gustafsson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 257 days.

(21) Appl. No.: 10/501,300

(22) PCT Filed: Jan. 25, 2002

(86) PCT No.: PCT/SE02/00139

§ 371 (c)(1),
(2), (4) Date: Jul. 12, 2004

(87) PCT Pub. No.: WO03/063532

PCT Pub. Date: Jul. 31, 2003

(65) Prior Publication Data

US 2005/0054367 A1  Mar. 10, 2005

(51) Int. Cl.
*H04B 1/00* (2006.01)
*H04B 15/00* (2006.01)

(52) U.S. Cl. .............. 455/63.1; 455/67.11; 455/67.13; 375/346; 375/349

(58) Field of Classification Search .............. 455/63.1, 455/525, 67.11, 67.13, 522, 226.1, 226.2, 455/226.3, 226.4, 296; 375/346, 349–350
See application file for complete search history.

(56) References Cited

U.S. PATENT DOCUMENTS 6,400,758 B1 * 6/2002 Goldston et al. ........... 375/216

FOREIGN PATENT DOCUMENTS

WO    WO9904588 A1   1/1999

(Continued)

OTHER PUBLICATIONS

Swedish Patent Office, International Search Report for PCT/SE02/00139 dated Sep. 17, 2002.

*Primary Examiner*—Lana Le
*Assistant Examiner*—Tuan H. Nguyen
(74) *Attorney, Agent, or Firm*—Roger S. Burleigh

(57) ABSTRACT

The present invention relates to a method to identify one or more interference sources in a mobile radio system, preferably in a GSM radio network for mobile telephones. A received signal (r) consists of a wanted signal and a number of interference signals of which one is a dominating interference signal and where all signals includes a known training sequence (TK1,TK2, . . . ). The carrier is estimated and subtracted from the received signal (r) giving a remaining interference signal (s).This signal is correlated against known training sequences (TKj, j=0,1,2, . . . ,7) resulting in a training sequence associated with the interfering signal. According to the invention, the identification code (BCC) of a possible interference source (BS1) from said training sequence is determined. After that, a number of candidates (CA1,CA2, ), each corresponding with a certain cell from the identification code (BCC) are determined and also the frequency which is disturbed and the timing offset (t1,t2, . . . FIG. 7) for the frequencies used by said candidates. Finally it is investigated if one or more (fa,fb) of these have the same time offset as the interference signal (t0) resulting in that at least one candidate (CA3) with the best matching offsets on its frequencies is identified as the interference source.

8 Claims, 3 Drawing Sheets

FOREIGN PATENT DOCUMENTS

| WO | WO0101713 | A1 | 1/2001 |
| WO | WO 0159936 | * | 8/2001 |
| WO | WO0159936 | A2 | 8/2001 |

* cited by examiner

METHOD FOR INTERFERENCE SOURCE IDENTIFICATION

BACKGROUND OF THE INVENTION

The present invention relates to a method to identify one or more interference sources in a mobile radio system, preferably in a GSM radio network for mobile telephones.

DESCRIPTION OF PRIOR ART

In a GSM radio network, frequencies must be reused since there is a limited number of frequencies available for a GSM radio network operator. The reuse of frequencies causes interference; i.e. the radio signal received at a certain point is a mixture of the carrier signal and signals from other sources. The carrier signal originates from the serving cell (the cell the mobile has a radio link to) and the interfering signal often from other GSM cells.

An important task for a GSM radio network operator is to reduce the amount of interference in the network. Clever frequency planning where frequencies are reused as sparsely as possible does this. However, since the traffic in GSM network increases, the frequencies must be reused tighter and tighter (with less distance between reuse of a frequency). This cause interference despite clever frequency planning.

When the interference gets too high, there will be problems like dropped calls, blocking and bad speech quality. In such areas a radio network operator wants to find the source of interference and rectify the problem to improve speech quality and reduce dropped calls. A common type of interference problem is co-channel interference. The interfering signal originates from another base station, which belongs to the same operator. The interfering base station is using the same frequency as used in the serving cell and causes interference.

The problem solving task, when having problems with co-channel interference, is normally done like this:
1. Identify a problem area.
2. Go out to the problem area and classify the problem (interference problem and kind of interference problem, for example co-channel interference)
3. If the problem is a co-channel interference problem the source of the interference needs to be found.

Step 1 and 2 above are quite straightforward. However, step 3 is not as simple. There can be quite a number of possible base stations from the same mobile operator that can be the source of the interference. To identify the base station or base stations that are the source is a complicated task.

There are a couple of known methods in this area:
Measuring of a test signal
Correlation against training sequences
Carrier estimation (without channel estimation)
Using training sequence correlation to find a number of possible interference sources (base stations)
Using a database with time information of received signals. The information is useful due to the fact that the base station system is not synchronised in time.

It is previously known see e.g. EP 1 001 565 A2 to identify interference signals of a base station in the system of the above mentioned kind by measuring the interference signals to the base station and thereafter identify these by filtering out the pattern sequence components of the received signals transmitted by the various base stations in the system. The pattern identifiers are derived from the pattern sequence components and a subset of these is matched with the base station's own pattern sequence. This known method uses in combination correlation and the regular time slot pattern of a control channel or a regular channel.

SUMMARY OF THE INVENTION

The previous mentioned known solution to correlate against training sequences gives false correlation; i.e. noise like correlation peaks. The peaks make the identification of an interference source difficult.

Another known solution uses a database with timing information that must be filled with data before the interference source can be found. Work is needed to keep database up to date. If the database is not kept up to date the information is useless.

Some solutions need continuous sampling of the received signal, which requires expensive hardware.

The invention provides a method to identify the source of interference signals in a mobile radio network. In the received signal the carrier signal is eliminated, leaving a remaining signal consisting of the interference signals and noise. The remaining signal is correlated with known training sequences and the training sequence with the strongest correlation is detected. When the training sequence used by each of the interference sources is identified, it is possible to identify a number of interference source candidates.

After having identified the above mentioned training sequences and if there is more than one candidate, the time offset of the signals on the interfered frequency and on the frequencies used by the candidates are measured and compared. The signal or signals with the same time offset as the interference signal are identified as originating from the interference source which results in a set of frequencies. The candidates whose frequencies are the same as or best matches the frequency set are identified as the interference sources.

The method according to the invention is characterized as it appears from the appended claim 1.

BRIEF DESCRIPTION OF THE DRAWINGS

The invention will now be described with reference to the enclosed drawings where.

DESCRIPTION OF PREFERRED EMBODIMENTS

Figure 1:
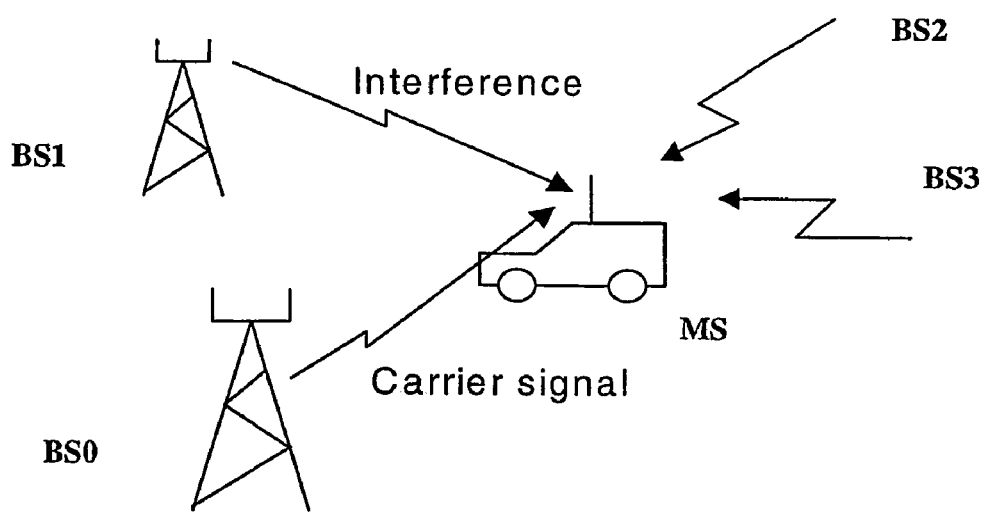
FIG. 1 illustrates generally two base stations sending a carrier signal and an interference signal, respectively to a mobile station in a mobile radio system.

FIG. 1 shows a simplified diagram of a part of a mobile radio system, for instance a GSM system with a sending base station BS0 and an interfering base station BS1 on near distance from BS0. Only two base stations are shown for the sake of simplicity, however it is understood that the system includes several more interfering base stations BS2,BS3, . . . as indicated. Base stations BS0,BS1, . . . are transmitting radio signals to a mobile station MS which is using the method according to the present invention. The mobile station MS can be in an operator's vehicle in which equipment using the method of the present invention is installed and is managed by educated personnel.

The signals transmitted between the base station BS0 and the mobile station MS are TDMA-signals transmitted by a carrier, i.e. a determined frequency which is one of a number of frequencies characteristic for that area (cell) which the base station BS0 is serving. The radio signal from BS0 is considered to be the wanted signal, while all other signals are the interfering signals.

As mentioned above, in a GSM radio network, frequencies must be reused since there is a limited number of frequencies available for a GSM radio network operator. The reuse of frequencies causes interference; i.e. the radio signal received by mobile station MS at a certain point is a mixture of the carrier signal from BS0 and signals from another base station BS1 sending with the same frequency as does BS0. Other base stations can also contribute to interference (not shown here). The carrier signal originates from base station BS0, the serving cell (the cell the mobile has a radio link to), and the interfering signal often from other GSM cells situated outside the cell cluster of the serving cell.

An important task for a GSM radio network operator is to reduce the amount of interference in the network. Clever frequency planning where frequencies are reused as sparsely as possible does this. However, since the traffic in GSM network increases, the frequencies must be reused tighter and tighter and consequently with less distance (the reuse distance) between reuse of a frequency. This cause interference despite clever frequency planning.

When the interference gets too high, there will be problems like dropped calls, blocking and bad speech quality. In such areas a radio network operator wants to find the source of interference and rectify the problem to improve speech quality and reduce dropped calls. A common type of interference problem is co-channel interference. The interfering signal originates from another base station, e.g. base station BS1 which belongs to the same operator. The interfering base station (BS1) is using the same frequency as used in the serving cell and causes interference.

Figure 2:
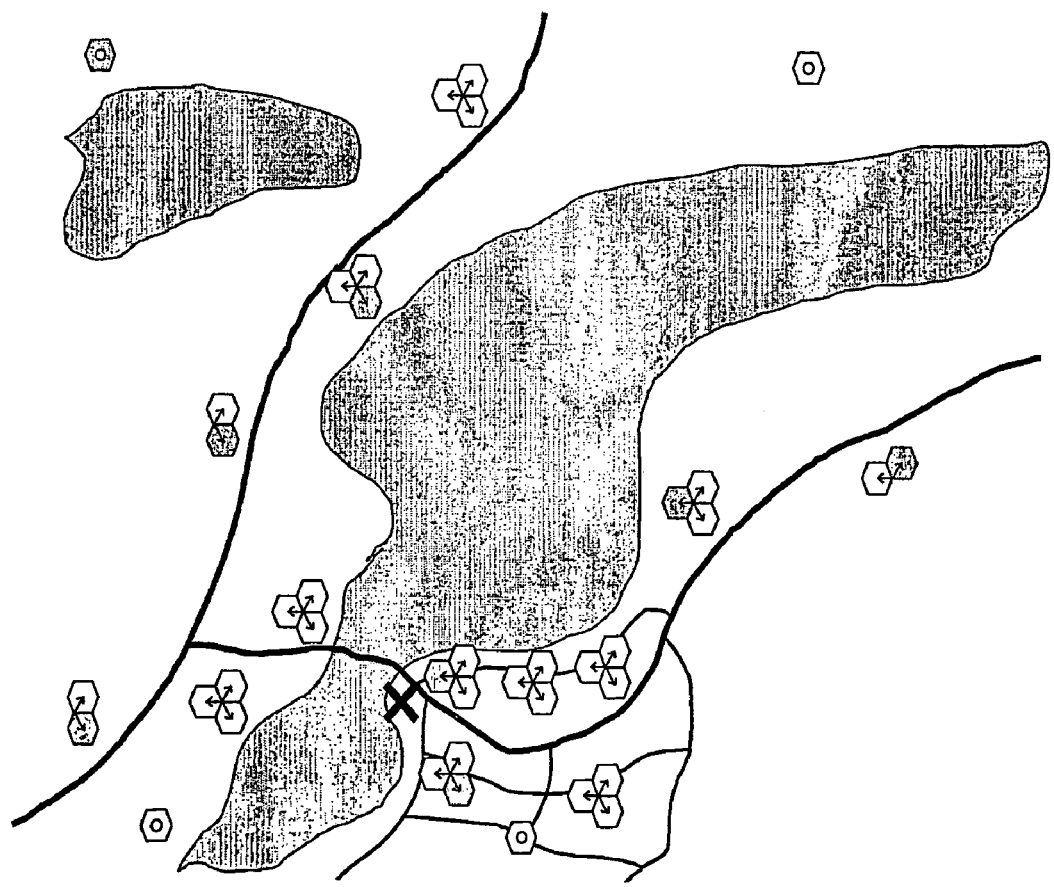
FIG. 2 illustrates more in detail cells in a GSM-system where there is interference problem.

In FIG. 2, GSM cells are represented with hexagons. The light grey cell is the serving cell (by the base station BS0 according to FIG. 1) and the cross next to the light grey cell is the position where a mobile station MS, served by the light grey cell, is experiencing an interference problem. All dark grey cells, served by other base stations BS1, BS2, . . . in FIG. 1 are using the frequency having interference problems in the light grey cell. All of the dark grey cells are possible sources of interference. The task is to identify the sources, or at least reduce the number of candidates as much as possible.

Generally, a base station has a Base station Colour Code (BCC) and is sending a training sequence, i.e. a signal pattern before and during a call in every burst which sequence is characteristic of that base station. This sequence is the so called Training Sequence Code (TSC) used by a GSM-cell and which is known to the system serving the area shown in FIG. 2. Normally the TSC number and BCC are set to the same number so if the TSC of an interfering base station is known, also the BCC of that base station is known.

In a GSM-system, there are 26 symbols in the middle of the burst, the TSC, that are ordered in a predefined pattern. This sequence is normally used by the equaliser in the mobile to estimate the channel through which the signal has passed. There are eight different TSCs numbered 0 to 7 and one C0 dummy TSC that is used on a C0 carrier with no traffic. By detecting which TSC the interferer uses together with the disturbed frequency the cell configuration list can be searched for possible candidates. The knowledge about where the different candidates are located makes it possible to further eliminate some candidates.

The reason why it is so difficult to identify which TSC is used by the interferer is that there is almost always a stronger signal present, the carrier. The carrier dominates the received signal and makes it extremely hard to detect a pattern besides the carrier pattern itself. Therefore the first thing to do is to remove the carrier. The carrier of the received signal is not known but it can be estimated by taking the detected bits and run them through a filter that models the physical channel.

An equaliser, a standard component in mobiles, performs the detection of carrier data. The whole carrier burst, data bits plus TSC, is then used to produce a channel model. The channel model is for example a least square (LS) estimate of an X-tap channel where X can be, for example, nine.

As mentioned earlier, the final estimated carrier is obtained by filtering the carrier bits through the channel model. The estimated carrier is then removed from the received signal. Left in the remaining signal should now be the interference signal and noise.

At this stage the focus can be set on finding which TSC that is used by the interference source and how it is synchronised in time. This is done by correlating the remaining signal against all TSCs and for all time offset. The TSC and offset that gives the highest correlation value is identified and does most likely belong to the interferer. To achieve any statistic stability the result from many correlations must be interpreted together and presented in an easily understandable manner.

The method according to the invention can be divided in three main steps.
1. Carrier estimation and removal
2. Correlation of signal against all training sequences and identification of interferer's BCC
3. Interferer candidate elimination The interferer is identified through its training sequence and to determine which training sequence an interferer uses the received signal is correlated against all known training sequences TKj (j=0,1,2,3, . . . 7). To improve the result from the correlation and to reduce the number of false peaks, the carrier is estimated and removed from the received signal, see FIG. 3 which shows a block diagram illustrating the inventive method.

Figure 3:
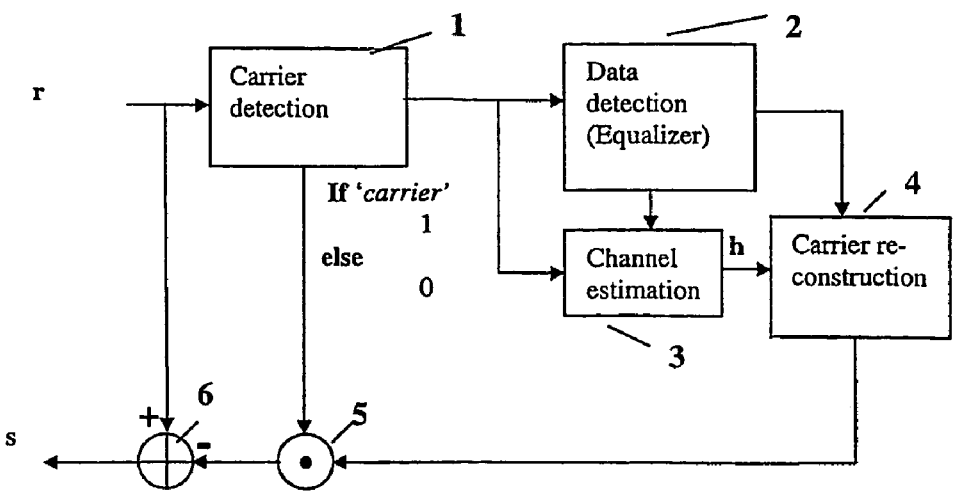
FIG. 3 shows a block diagram of an algorithm according to one feature of the present invention.

First of all it is determined if there is any carrier present to remove or not, block 1 in FIG. 3, and if it is, the sent data sequence is determined for example with a standard mobile equaliser, block 2. A channel model, h, is produced by estimating the transfer function, for example an LS-estimate, from sent data to received signal, block 3. All sent symbols, not only the training sequence, are used to generate the channel model. This to achieve a better channel estimate than the equaliser does. The carrier part in the received signal is obtained when the sent symbols are filtered through the channel model, block 4. Block 5 is an ordinary AND-circuit.

Finally the estimated carrier is subtracted in a subtractor 6 from the received signal r leaving only the interferer and some noise, signal s. The remaining signal s after the carrier has been removed is used to detect the interferer's training sequence. The training sequence code number (0 . . . 7) is the same as the BCC number mentioned above. The search for the training sequence code number is, as mentioned, done by correlation against the preknown training sequence patterns or by applying some other equivalent operation on the remaining signal. An identification of the BCC is achieved by detecting the strongest correlation value of the different correlations, as will be described in connection with FIG. 4.

The algorithm can be supplied with measurement data from a standard mobile. Measurement data is collected during drive tests in the area where interference problems have been registered. Since interference phenomena are rather local in space, measurements should be performed when not moving or moving at low speed.

Data are collected in such a way that an interferer should be possible to detect in an unsynchronised network. To assure that a whole TSC of an interferer is received, at least 1½ carrier burst is sampled each time and this is done a number of times per second.

At first, when the MS receives an interfered signal r, the carrier is eliminated giving a remaining signal s without any carrier as described above. The signal s is thereafter correlated with known training sequences for a number of offsets n=1,2,3, . . . , N i.e. s is correlated against TKj, where TKj are the $j^{th}$ known training sequence.

This gives the following exemplary table: (I indicates strong correlation and X indicates very strong correlation). Signal s is the signal which the training sequences are correlated against, where n indicates time offset relative to serving cell.)

TABLE

|     | s(0) | s(1) | s(2) | s(3) | s(4) | s(5) | s(6) | s(7) | s(8) | ... | s(N) |
|-----|------|------|------|------|------|------|------|------|------|-----|------|
| TK0 | 0    | 0    | 0    | I    | 0    | 0    | 0    | 0    | 0    |     | 0    |
| TK1 | 0    | 0    | 0    | 0    | 0    | 0    | I    | 0    | 0    |     | 0    |
| TK2 | 0    | 0    | 0    | I    | 0    | 0    | 0    | 0    | 0    |     | 0    |
| TK3 | 0    | I    | 0    | 0    | 0    | X    | X    | 0    | 0    |     | 0    |
| TK4 | 0    | 0    | 0    | 0    | 0    | 0    | 0    | 0    | I    |     | I    |
| TK5 | 0    | 0    | 0    | 0    | I    | 0    | 0    | 0    | 0    |     | 0    |
| TK6 | 0    | I    | I    | 0    | 0    | 0    | 0    | 0    | 0    |     | 0    |
| TK7 | 0    | 0    | 0    | 0    | 0    | 0    | 0    | 0    | I    |     | 0    |

In this case the strongest correlation was achieved for training sequence 3 at offset around 5 or 6.

Every position (marked with I, O or X) in the figure above is an average made over several bursts. This eliminates, or at least reduces, the false correlation peaks.

Figure 4:
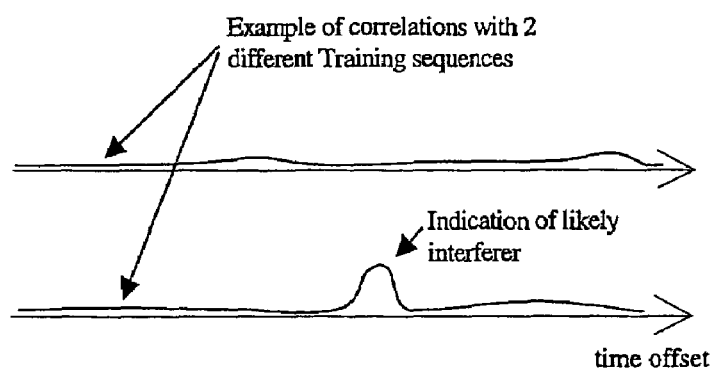
FIG. 4 shows a diagram of an exemplary correlation to training sequences.

FIG. 4 shows in a diagram an example of correlation against different training sequences. The signal s in which the carrier signal has been removed and which is disturbed by BS1 is correlated against TKa and TKb. This results in the curves A and B where a peak can be seen (indicated by the arrow) in curve B. This indicates that the interference source is using training sequence, curve B.

Figure 5:
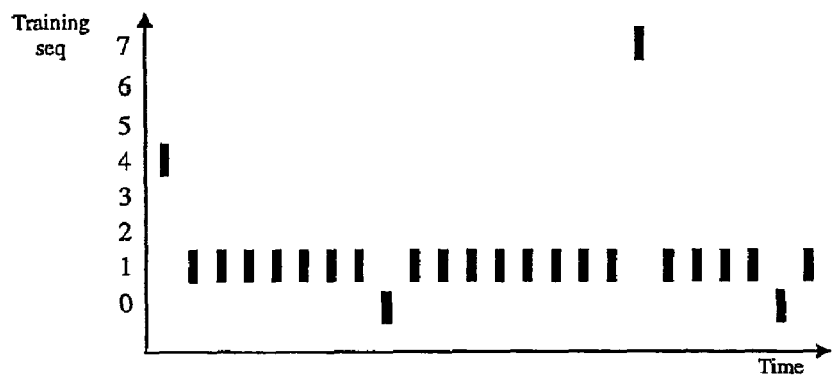
FIG. 5 shows a diagram of a the training sequence with the highest correlation value plotted over time.

FIG. 5 shows a diagram of the training sequence with the highest correlation value plotted over time. To make a valid identification the results from many samples must be interpreted together. The training sequence with the strongest correlation to the remaining signal is identified for every sample and indicated with a short line. In this example it can be seen that most of the time the same training sequence (#1) is indicated.

Figure 6:
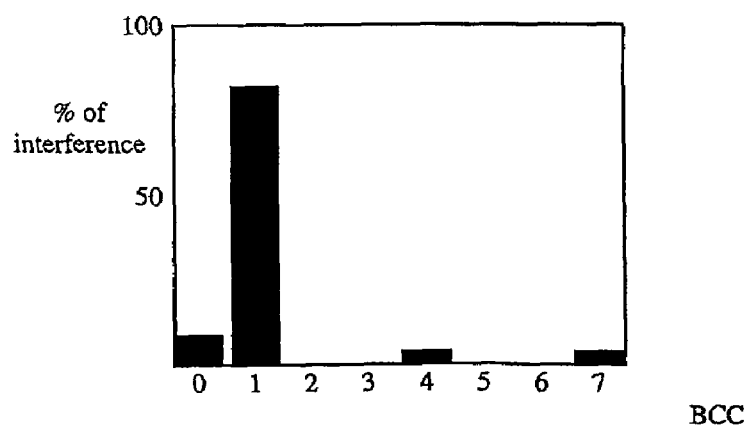
FIG. 6 shows the percentage for a specified time window that a certain training sequence has had the strongest correlation.

FIG. 6 shows the percentage for a specified time window that a certain training sequence has had the strongest correlation. In this example training sequence 1 has been identified in approximately 80% of the samples.

From FIGS. 5 and 6 which are available to the operator (i.e. the person in vehicle MS), the BCC of the disturbing base station is determined. From a cell data base, also available to the operator, possible candidates are identified which are in accordance with the BCC and the disturbed frequency.

The identified BCC will most of the time leave more than one possible candidate as source to the interference. According to a further feature of the present invention, the time offset and the fact that most of the candidates transmit on more than one frequency is used to eliminate some of the candidates. First of all, the offset of the interferer relative to the synchronisation channel is determined. Then, for all the frequencies used by each and every of the candidates, measurements are made to determine the offsets, relative to the synchronisation channel. If the offset for a signal on a certain frequency corresponds to the offset of the identified interferer it is assumed to have the same origin and all cells not using this frequency can then be removed from the candidate list. This results in that the number of candidates can be reduced as long as the candidate cells contain different sets of frequencies.

Figure 7:
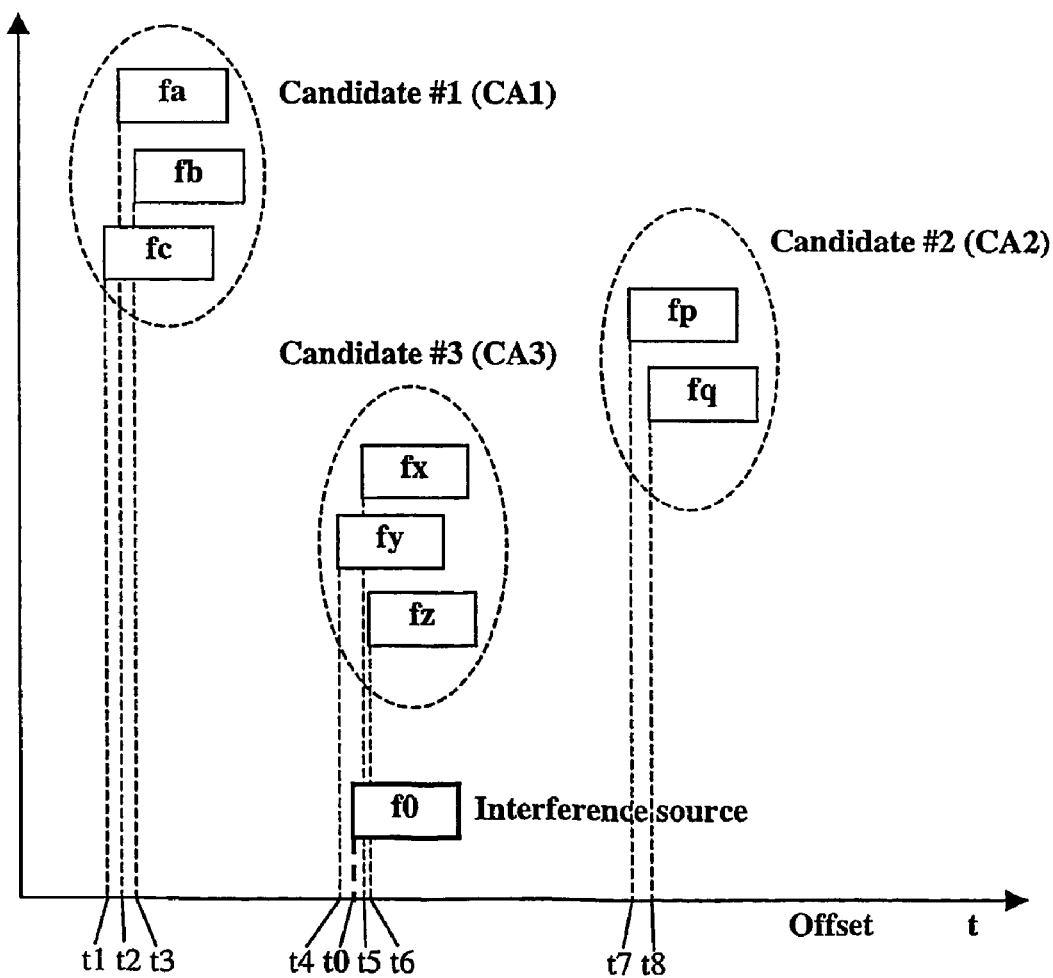
FIG. 7 shows a time diagram with interference source candidates illustrating the candidate elimination.

FIG. 7 illustrates the timing offset of the training sequence for signals on different frequencies. The frequencies on which offset is measured are the frequencies that are used by the different candidates. The offset is estimated through correlation against the known training sequence used by the interference source. As can be seen in the figure the signals on frequencies fx, fy and fz have approximately the same offset as the identified interference source (f0). The offset of the signals on frequencies fa, fb, fc, fp and fq deviate clearly from the offset of the interference source. Since fx, fy and fz all belong to candidate #3 it is the most probable interference source.

Merits of Invention

The basic problem, to identify the source of interference signals in a GSM radio network is solved by our solution. Carrier elimination is used in our invention, which makes it possible to find interference signals with low signal strength.

Channel estimation in our invention, based on all bits, makes the estimation accurate. The better channel estimation the better carrier elimination.

No need to measure timing data and store in database.

Timing data is measured when needed. This makes the invention robust—the current network configuration and timing is used. Our invention is different from solutions where a database with timing data is used. The database must be kept up to date, which is not an issue in our invention.

No need for continuous measurement (simple hardware is sufficient).

The invention claimed is:

1. A method to identify an interference source in a mobile radio network, wherein a received signal consists of a wanted signal and a number of interference signals of which one is a dominating interference signal and where all signals include a known training sequence, said method comprising the steps of:
   estimating the carrier and subtracting this carrier from the received signal;
   forming a remaining interference signal and correlating said interference signal against known training sequences, resulting in a determined training sequence associated with the interfering signal;
   finding an identification code of a possible interference source from said determined training sequence;
   determining a number of candidates from said identification code, each of said candidates corresponding with a certain cell and the frequencies which are disturbed;
   determining the timing offset for the frequencies used by said candidates; and
   investigating if one or more of these frequencies have the same time offset as the interference signal, whereby the at least one candidate with the best offset matching of its frequencies in relation to other candidates is identified as the interference source.

2. The method according to claim 1, wherein said step of forming a remaining interference signal comprises the steps of:
   estimating both the training sequence and the data of the received signal;
   generating a channel model by using said estimation of the training sequence and the data, said channel model being used to estimate the carrier; and
   subtracting the estimated carrier from the received signal, leaving the remaining interference signal.

3. The method as recited in claim 2, wherein said estimated carrier is produced by filtering the estimated bits through the channel model obtained by said channel estimation.

4. The method as recited in claim 1, further comprising the steps of:
   determining the time offset of the interfering signal;
   determining the time offset of a set of frequencies from each of said candidates; and
   comparing the time offset of said frequency set with the time offset of the identified interferer, the candidate having the frequencies which best match said frequency set being identified as the interference source.

5. The method according to claim 4, wherein, to eliminate false interference source candidates, said candidate cells contain different sets of frequencies, and wherein said method further comprises the step of removing all cells not using the frequency set whose offset corresponds to the offset of the identified interferer.

6. The method as recited in claim 1, wherein the serving cell uses a synchronization channel, and wherein the step of investigating if one or more of these signals have the same time offset as the interference signal further comprises the steps of:
   determining the time offset of the interfered signal relative to the synchronisation channel; and
   measuring the offset for all signals on said candidate's frequencies in relation to said synchronization channel and, if the offset so measured are the same for a number of said signals on certain frequencies, these signals are assumed to have the same origin and the frequencies can be assigned to what is considered to be the interfering source.

7. The method as recited in claim 1, further comprising the steps of:
   calculating, for a defined time and for every training sequence, the percent of interference of all samples for which the training sequence had the strongest correlation; and
   graphing the percent of interference for all training sequences.

8. The method as claimed in claim 7, wherein, for every sample, said step of graphing identifies which training sequence had the strongest correlation.

* * * * *